United States Patent
Gao et al.

(10) Patent No.: US 10,223,287 B2
(45) Date of Patent: Mar. 5, 2019

(54) METHOD AND SYSTEM FOR CACHE MANAGEMENT

(71) Applicant: International Business Machines Corporation, Armonk, NY (US)

(72) Inventors: Yang Gao, Beijing (CN); Jing Sun, Beijing (CN); Lei Sun, Beijing (CN); Zi Yan Tu, Beijing (CN); Yan Mei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/593,403

(22) Filed: May 12, 2017

(65) Prior Publication Data

US 2017/0249259 A1    Aug. 31, 2017

Related U.S. Application Data

(63) Continuation of application No. 14/824,384, filed on Aug. 12, 2015, now Pat. No. 9,690,712.

(30) Foreign Application Priority Data

Aug. 29, 2014 (CN) .......................... 2014 1 0437031

(51) Int. Cl.
*G06F 12/12* (2016.01)
*G06F 12/128* (2016.01)
(Continued)

(52) U.S. Cl.
CPC ........ *G06F 12/128* (2013.01); *G06F 12/0808* (2013.01); *G06F 12/0891* (2013.01);
(Continued)

(58) Field of Classification Search
CPC ............... G06F 12/0891; G06F 12/128; G06F 12/0808; G06F 2212/604;
(Continued)

(56) References Cited

U.S. PATENT DOCUMENTS 6,807,607 B1   10/2004   Lamparter
6,934,720 B1   8/2005    Jacobs et al.
(Continued)

FOREIGN PATENT DOCUMENTS

CN          105446909 A       3/2016

OTHER PUBLICATIONS

"List of IBM Patents or Patent Applications Treated As Related", filed May 12, 2017, 2 pages.
(Continued)

*Primary Examiner* — Hua J Song
(74) *Attorney, Agent, or Firm* — David B. Woycechowsky

(57) ABSTRACT

Machine logic (for example, software) for cache management. comprising cache management method includes the following operations: determining, in response to a cache entry is created, a category for the cache entry; and determining a predicted time point of an invalidation event associated with the category, wherein occurrence of the invalidation event will cause invalidation of catching entries of the category; setting a valid period of the cache entry based on the predicted time point.

18 Claims, 2 Drawing Sheets

(51) Int. Cl.
*G06F 12/0891* (2016.01)
*G06F 17/30* (2006.01)
*G06F 12/0808* (2016.01)

(52) U.S. Cl.
CPC ........ *G06F 17/30* (2013.01); *G06F 17/30902* (2013.01); *G06F 2212/1044* (2013.01); *G06F 2212/604* (2013.01); *G06F 2212/621* (2013.01); *G06F 2212/69* (2013.01)

(58) Field of Classification Search
CPC ....... G06F 2212/1044; G06F 2212/621; G06F 2212/69; G06F 17/30; G06F 17/30902
USPC ........................................................ 711/133
See application file for complete search history.

(56) References Cited

U.S. PATENT DOCUMENTS

| | | | | |
|---|---|---|---|---|
| 7,480,767 | B2* | 1/2009 | Moser | G06F 12/123 707/999.202 |
| 7,783,757 | B2 | 8/2010 | Plamondon | |
| 8,086,803 | B2 | 12/2011 | Muthiah et al. | |
| 8,533,393 | B1* | 9/2013 | Cote | G06F 12/0804 711/118 |
| 8,566,521 | B2 | 10/2013 | Wang | |
| 8,650,266 | B2 | 2/2014 | Cohen | |
| 2003/0167257 | A1* | 9/2003 | de Bonet | G06F 17/30902 |
| 2007/0156966 | A1* | 7/2007 | Sundarrajan | G06F 12/0808 711/133 |
| 2007/0226252 | A1 | 9/2007 | Iyengar et al. | |
| 2008/0209120 | A1 | 8/2008 | Almog et al. | |
| 2009/0198790 | A1 | 8/2009 | Grevers, Jr. | |
| 2013/0073809 | A1 | 3/2013 | Antani et al. | |
| 2016/0062903 | A1 | 3/2016 | Gao et al. | |

OTHER PUBLICATIONS

Alici et al., "Adaptive Time-to-Live Strategies for Query Result Caching in Web Search Engines", ECIR 2012, LNCS 7224, pp. 401-412, 2012, © Springer-Verlag Berlin Heidelberg 2012.

Reddy et al., "An Adaptive Mechanism for Web Browser Cache Management", IEEE Internet Computing (vol. 2, Issue:1), pp. 78-81, Issue Date: Jan./Feb. 1998, Current Version: Aug. 6, 2002, doi: 10.1109/4236.656085.

"System and method for Ranged-Based Time-To-Live Eviction Based on Learned Behavior", An IP.com Prior Art Database Technical Disclosure, Authors et. al.: Disclosed Anonymously, IP.com No. 000220548, IP.com Electronic Publication: Aug. 6, 2012, 3 pages.

* cited by examiner

METHOD AND SYSTEM FOR CACHE MANAGEMENT

BACKGROUND

Embodiments of the present invention relate to a method and system for cache management.

Cache means storing previously accessed contents in a local storage location, allowing a quick response to a subsequent access request for the same content. Caching technology is widely used in various fields such as computer processor, storage system, data system, and network application. For example, in a network environment, a web page or other network content previously accessed by a user may be cached locally in a client. When a user again accesses a web page that he/she has previously accessed, he/she may directly read the cached web page from a local storage, rather than again obtaining that web page through the internet from a remote server. This kind of caching typically shortens response time and reduces consumption of network bandwidth resources and server computing resources.

It is important in cache management to handle "cache invalidation." Cache invalidation means the cached content is inconsistent with the actual latest version of the content, such that the cached content loses its original function. Cache invalidation is typically caused by backend update of the content. For example, when a web server updates the content in the web page, a cache item of the web page in the client will typically be invalidated. When a cache item is invalidated, it should be removed from the cache.

A time-based solution for managing cache invalidation is known. Each caching entry is assigned a fixed valid period. When the valid period expires, the corresponding cache entry is removed from the cache on the assumption that it has probably become invalid. However, in practice, this leads to: (i) deletion of cache entries that are still valid (because no invalidating changes have been made despite the passage of time); and (ii) some other cache entries might already have been invalidated prior to the expiration of the validity period.

Another kind of solution is handling cache invalidation based on event rules. Each cache entry may be associated with one or more predetermined events. When one of the predetermined events occurs, the corresponding cache entry will be determined invalid and deleted from the cache. However, in a distributed system involving multiple parties, the event-based cache invalidation management is difficult to implement. For example, in an internet e-commerce system, a web page is often cached on a content distribution network (CDN), enterprise server and client side. In such a case, a cross-system event trigger mechanism is required to manage cache invalidation. However, cross-system event trigger mechanisms are typically difficult to develop and maintain, so it may not be feasible to implement cache invalidation based on event rules for some applications.

SUMMARY

According to an aspect of the present invention, there is a method, computer program product and/or system that performs the following operations (not necessarily in the following order): (i) defining a plurality of categories for categorizing cache entries; (ii) for each category of the plurality of categories, determining a valid period applicable to cache entries in the category; (iii) responsive to creation of entry into a cache of a first cache entry, determining a selected category, of the plurality of categories, for the first cache entry; and (iv) removing the first cache entry from the cache at the end of the valid period for the selected category.

BRIEF DESCRIPTION OF THE DRAWINGS

Through the more detailed description of some embodiments of the present disclosure in the accompanying drawings, the above and other objects, features and advantages of the present disclosure will become more apparent, wherein.

In respective figures, same or like reference numerals are used to represent the same or like components.

DETAILED DESCRIPTION

Some embodiments of the present invention provide a technical solution for managing cache more effectively.

In one aspect of the present invention, there is provided a method for caching management. The method includes the following operations (not necessarily in the following order): determining, in response to a cache entry is created, a category for the cache entry; determining a predicted time point of an invalidation event associated with the category, wherein occurrence of the invalidation event will cause invalidation of cache entries of the category; and setting a valid period of the cache entry based on the predicted time point.

According to another aspect of the present invention, there is provided a system for cache management. The system includes: (i) a category determining unit configured to determine, in response to a caching entry created, a category for the cache entry; (ii) a time point determining unit configured to determine a predicted time point of an invalidation event associated with the category, wherein occurrence of the invalidation event will cause invalidation of cache entries of the category; and (iii) a valid period setting unit configured to set a valid period of the cache entry based on the predicted time point.

According to some embodiments of the present disclosure, time-based and invalidation event-based cache invalidation mechanisms are integrally combined. The valid period of a cache entry is not simply set to a fixed value, but may be set adaptively and flexibly based on a predicted occurrence time point of an invalidation event of a corresponding category. In this way, it helps keep the validity period of the cache entry, used for deletion determinations, closer to matching the time period that the cache entry is valid as a functional matter. Moreover, according to some embodiments, a high-cost event trigger mechanism is not needed. Therefore, in some embodiments, a cache can be managed more accurately and efficiently.

Some embodiments will be described in more detail with reference to the accompanying drawings, in which the preferable embodiments of the present disclosure have been illustrated. However, the present disclosure can be implemented in various ways, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
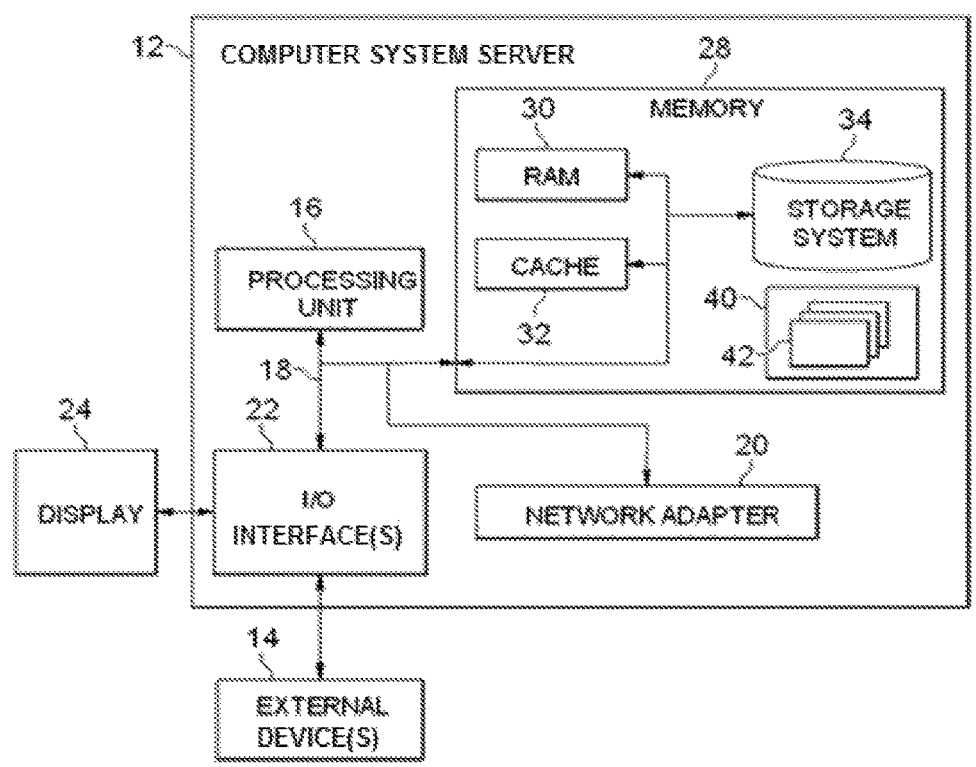
FIG. 1 shows a computer system/server which is applicable to implement the embodiments of the present invention.

Referring now to FIG. 1, in which computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (for example, a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (for example, at least one) of program modules that are configured to carry out the functions of embodiments of the invention.

Program/utility 40, having a set (as used herein, set means "at least one") of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (for example, network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (for example, the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID (redundant array of independent storage devices) systems, tape drives, and data archival storage systems, etc.

Hereinafter, the mechanism and principle of the embodiments of the present invention will be described in detail. Unless otherwise stated, the term "based on" used hereinafter and in the claims expresses "at least partially based on." The term "comprise" or "include" or a similar expression indicates an open inclusion, that is, "including, but not limited to . . . ." The term "plural" or a similar expression indicates "two or more." The term "one embodiment" indicates "at least one embodiment." The term "another embodiment" indicates "at least one further embodiment." Definitions of other terms will be provided, below, in the following description below.

Figure 2:
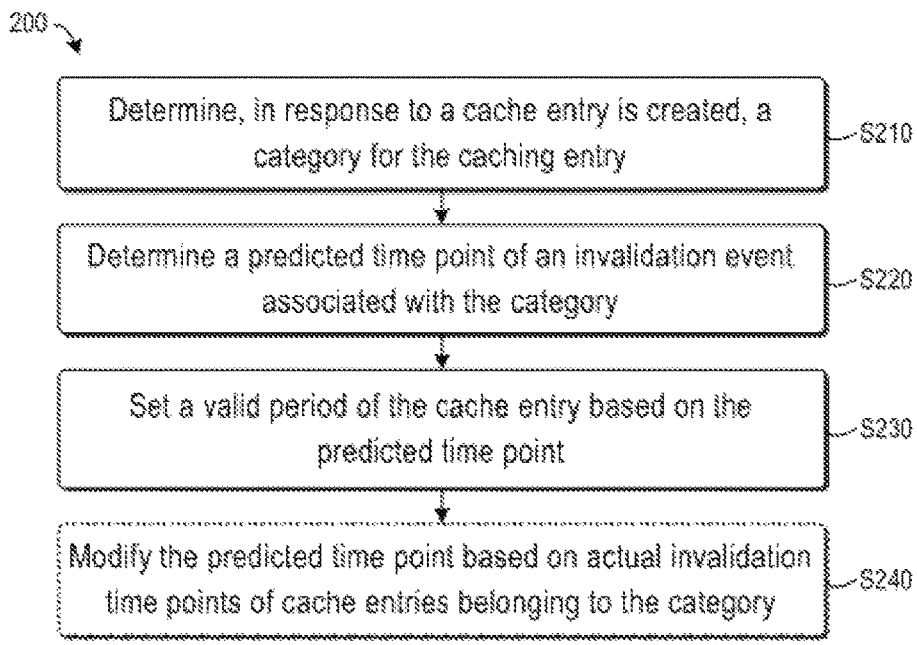
FIG. 2 shows a schematic block diagram of a method for cache management according to embodiments of the present invention.

FIG. 2 shows a flow diagram of a method 200 for managing cache according to the embodiments of the present invention. In the description below, the cache management mechanism of the present invention will be illustrated with reference to network contents (for example, web page). However, it should be noted that this is only exemplary, not intended to limit the scope of the present invention in any manner. Embodiments of the present invention may be used for managing cache of contents of any appropriate type.

Method 200 starts at step S210, in which a category of a new cache entry is determined in response to receipt of the new cache entry for caching. With a web page as an example of the new cache entry to be cached, when a user first accesses the web page, a cache entry of the web page may be created in a local cache of the client. In one embodiment, a web page may be saved in a cache entry as a whole. Alternatively, in another embodiment, a plurality of cache entries may be created for one web page, each cache entry saving a part of content of the web page. In particular, in one embodiment, a cache entry associated with each web page is associated with a uniform resource locator (URL) of the web page.

In response to a new cache entry being created, in step S210, a category of the cache entry may be determined through various different ways. For example, in one embodiment, a plurality of predefined categories of cache entries may be generated in advance through learning during a training phase. With a web page as an example, during the training phase, cache entries for a plurality of web pages may be generated first. In one embodiment, a cache entry may be generated for an actual web page. For example, a cache entry may be generated for all or some web pages of a web site to be accessed. Alternatively, or additionally, a web page specifically for training may also be used to generate a cache entry. In other words, according to the embodiments of the present invention, a training data set may be identical to or different from a data set actually to be accessed.

For these generated cache entries (called "training cache entries"), they may be grouped according to any appropriate standard or measurement, grouping these training cache entries into a plurality of categories. For example, in one embodiment, the training cache entries may be grouped based on time points for the invalidation events of these training cache entries. The term "invalidation event" herein refers to an event that will cause an associated cache entry to become non-functional as a functional matter (and not merely because the cache entry has been deleted from, or indicated as inactive in, the cache where the cache entry is cached). As an example, in a network application environment, an invalidation event may include, but is not limited to, one or more of the following: editing the web page, data import, data export, data synchronization, file update, database update, etc.

A time point for an invalidation event of a training cache entry may be determined through various techniques. For example, in one embodiment, a time point for an invalidation event may be determined through real-time monitoring occurrence of the invalidation event. As an example, assume an invalidation event of a training entry includes user edition and data synchronization. At this point, the training cache entry may be monitored in real-time specifically for the both types of events, and the time when the invalidation event occurs for the first time is defined as the time point of invalidation event for the training cache entry.

Alternatively, or additionally, time points of invalidation events for one or more training cache entries may be designated by the user. For example, in one embodiment, the user may designate that a web page associated with books sale will be updated at 16:00 (that is 4:00 pm, "pm" may be used herein in connection with a 24-hour clock despite the fact that the "pm" indication amounts to redundant information) every day. At this point, the invalidation event time for cache entries of web pages of all books sale may be set at 16:00.

As another example, in one embodiment, an actual invalidation time of a training cache entry may be used as an estimate of the invalidation event time point. Specifically, in such an embodiment, the valid period for each training cache entry may be set enough long. In other words, the training cache entry will not be deleted due to timeout. Afterwards, the training cache entries will be scanned periodically at a shorter predetermined time interval (for example, 5 minutes or 10 minutes). In each scan, it is determined whether each scanned training cache entry is invalidated as a matter of that training cache entry no longer being functional. This may be implemented through comparing the cache entry data with the current actual data of a relevant web page. If a training entry is determined invalidated in one scan, the time when the scan is executed is defined as the invalidation time point for the entry. This invalidation time point is then used as an estimate of the time point of invalidation event for the training cache entry. The invalidated time point will be excluded from subsequent scans.

As an example, assume an entry is maintained valid in the scan at 14:00 pm, but becomes invalid in the next scan immediately executed at 14:05 pm; then the time point of invalidation event for the cache entry is estimated at 14:05 pm. It may be understood that such estimate likely has some degree of error, because the invalidation event of the cache entry may possibly occur at any time point between 14:00 pm and 14:05 pm. However, by setting the scan interval small enough, such errors may be controlled to remain within an allowable range.

Some embodiments repeat the above process until all training cache entries are invalidated. Alternatively, the training process may stop in response to reaching a predetermined training time (for example, one day or more days). In this way, a time point of invalidation event for each training cache entry may be obtained. Then, the training cache entries may be grouped based on the invalidation event time point. In one embodiment, the grouping may be implemented through clustering, such that training cache entries whose time points of invalidation events are close to each other are grouped in the same group. Any clustering methods (now existing or to be developed in the future) may be used in conjunction with various embodiments of the present invention. The scope of the present invention is not limited thereto.

Each group obtained from clustering the training cache entries is regarded as a "category" of cache entries. In such an embodiment, in step S210, an attribute of a newly created cache entry may be extracted, and based on the attribute, one category is selected from a plurality of predetermined categories obtained through training. For example, in one embodiment, the attribute may be a URL (uniform resource locator) of a web page corresponding to a cache entry. The URL may be matched to URLs of training cache entries of respective predefined categories, to find the best matching URL. Correspondingly, the category of the training cache entry having the best matching URL may be determined as the category for the newly created cache entry.

In one embodiment, a portion of the string representing a larger URL may be used as an attribute of the cache entry. For example, in one embodiment, a URL for presenting the web page of an article may include information such as identification, classification, provider, seller and the like of the article. As an example, in the URL, "&ArticleID=xyz" may represent the identification of the article. In such an embodiment, one or more such sections in the URL may be extracted, and the extracted section may be used to perform matching with the training cache entries in the predefined category, thereby determining the category of the newly created cache entry.

It should be understood that the embodiment described above is only exemplary, not intended to limit the scope of the present invention. Based on the teaching provided by the present invention, the above embodiment may be subject to various modifications or transformations. For example, in an alternative embodiment, instead of clustering the training cache entries according to the time points of invalidation events, the training cache entries may be grouped according to various other standards, such as a URL of a web page or a section thereof, product attributes (for example, category, identification, provider, place of production, etc.), to determine a plurality of predefined categories. For each predefined category, a time point of invalidation event associated with the category may be designated by the user manually.

As an example, in an e-commerce environment, a web page may be used to present a corresponding article. In one embodiment, cache entries of a web page may be grouped based on types of articles. For example, the cache entries may be divided into a plurality of categories, such as "books," "electrical appliances," "clothes," and the like. For each category, the user may designate its time point of invalidation event according to the actual use condition. For example, if an operator updates data for inventory and prices of books at 16:00 pm every day, then the time point of invalidation event for the "books" category may be set 16:00 pm.

Note the embodiments described above are only examples, and the training cache entries may be grouped based on any appropriate attributes. Moreover, in one embodiment, the grouping of training entries may even be performed by a user manually. The scope of the present invention is not limited here in this respect.

Continuing to refer to FIG. 2, method 200 proceeds to step S220. In step S220, a predicted time point for an invalidation event associated with the category determined in step S210 is obtained. As stated above, the category of a newly created cache entry may be selected from a plurality of predefined categories. In one embodiment, the predefined categories are obtained by grouping the training cache entries based on the time points of invalidation events of the training cache entries. In such an embodiment, the time points of invalidation events of training cache entries belonging to the category may be obtained, and the predicted invalidation event time for the newly created cache entry may be determined based on these invalidation event time points. For example, in one embodiment, an average value, a maximum value or a minimum value of the time points of invalidation events of all training cache entries belonging to the category may be computed, as the predicted time point of invalidation event of the newly created cache entry.

Alternatively, in another embodiment, as stated above, the time point for the invalidation events of each category may be designated by the user. In this case, the time point of invalidation event that is designated by the user in the category to which the newly created cache entry may be directed used as the predicted time point for the invalidation event of the newly created cache entry.

Next, in step S230 of method 200, a valid period for the cache entry is set based on the predicted time point of an invalidation event determined in step S220. Specifically, the valid period may be set to a difference between a predicted time point of an invalidation event and a creation time of the cache entry. For example, assume the creation time of a cache entry is 9:00 am, while the predicted time point of invalidation event for the cache entry is 14:00 pm. In this example, the valid period for the newly created cache entry may be set to 14:00 minus 9:00 which equals five (5) hours.

According to some embodiments of the present invention, the invalidation event-based and the time-based cache management mechanisms are integrally combined. The valid period for each cache entry will not be simply set as predefined time. On the contrary, setting of the valid period for the cache entry is set based on the predicted invalidation event time point. In this way, management of invalidation of cache entries will be more accurate and effective. Meanwhile, the invalidation event is embodied in the form of cache entry valid period, without bothering to use an explicit event call as in the known solutions. In this way, some embodiments of the present invention can be better suitable to a cross-platform distributed environment. Therefore, some embodiments of the present invention have the advantages of both time-based cache management and event-based cache management, while overcome the drawbacks of the two.

In one embodiment, method 200 may proceed to an optional step S240 in which feedback for cache entries during use is collected, so as to adjust the time point of invalidation event of one or more categories of cache entries. Specifically, for any given category, a predicted time point of the invalidation event of the category may be modified based on the predicted time point of the invalidation event associated with the category, as determined in step S220, and actual invalidation time points of more cache entries belonging to the category.

Specifically, for any given category, the number of cache entries (called "a first group of cache entries"), among the cache entries in the category, whose invalidation time points are earlier than the predicted time point, may be determined. Then, the percentage of the first group of cache entries over all cache entries in the category may be computed, which is called "a first percentage." For example, in one embodiment, it may be detected how many entries among the cache entries in this category have been invalidated at a predetermined time point (called "first time point") before the predicted time point of invalidation event of that category. In this embodiment, the cache entries having been invalidated at the first time point form a first group of cache entries. In particular, the cache entries detected at the first time point may include the actual cache entries designated to the category during operation.

The first percentage may be compared with a predetermined threshold (called "first threshold"). If the first percentage is higher than the first threshold, it indicates that the current predicted time point of invalidation event associated with the category might be later. In this case, the predicted time point of the invalidation event of the category may be advanced appropriately. Of course, the predicted time point of the invalidation event may be advanced to any other appropriate time.

As an example, assume the current predicted time point of the invalidation event associated with a given category of the cache entry is 10:00 am, the first time point is 9:55 am, and the first threshold is 10%. In this case, it will be detected at 9:55 am whether each cache entry belonging to this category has been invalidated. The cache entries detected to have been invalidated at 9:55 am form a first group of cache entries. If it is found that the percentage of the first group of cache entries over all cache entries of the category exceeds 10% (that is, at 9:55 am, more than 10% of the cache entries in the category have been invalidated), then the predicted time point for the invalidation event may be advanced. For example, in one embodiment, the predicted time point for the invalidation event may be advanced to 9:55 am.

Alternatively, or additionally, in one embodiment, for any given category, the number of cache entries (called "second group of cache entries"), among the cache entries of the category, whose actual invalidation time point is later than the predicted time point, may be determined. Next, the percentage of the second group of cache entries over all cache entries of the category may be computed, which is called "second percentage." For example, in one embodiment, it may be detected how many entries are still maintained valid among the cache entries of the category at a predetermined time point (called "second time point") later than the predicted time point for the invalidation event of the category. In this embodiment, the cache entries maintained valid at the second time point form a second group of cache entries. Similar to the first group of cache entries, the second group of cache entries may include the actual cache entries assigned to this category during operation.

The second percentage may be compared with a predetermined threshold (called "second threshold"). If the second percentage is higher than the second threshold, it indicates that the current predicted time point of invalidation event associated with the category might be earlier. In this case, the predicted time point for the invalidation event of the category may be postponed appropriately. For example, in one embodiment, the predicted time point for the invalidation event may be postponed to the second time point. Of course, the predicted time point for the invalid event may be postponed to any other appropriate time.

Still consider the example as described above, wherein the current predicted time point of the invalidation event of the category is 10:00 am. Assume the second time point is 10:05 am, and the second threshold is 10%. Note that although the first threshold is equal to the second threshold in this example, it is only exemplary. In other embodiments, the first threshold might not be equal to the second threshold. If it is detected that more than 10% entries among the cache entries belonging to the category remains valid at 10:05 am, the predicted time point for the invalidation event may be postponed, for example, to 10:05 am.

In particular, in one embodiment, comparison between the first percentage and the first threshold may be performed, and comparison between the second percentage and the second threshold may also be performed. If the first percentage is greater than the first threshold while the second percentage is greater than the second threshold, it indicates that a considerable number of cache entries in the category have already been invalidated before the predicted time point of the invalidation event. Meanwhile, a considerable number of cache entries in the category still maintain valid after the predicted time point for the invalidation event. Because of these mismatches (occurring in both directions) between predicted invalidation and actual invalidation of this category of cache entries, it can be surmised that this category fails to correct reflect the rules of invalidation events of the cache entries in terms of time, and that improvements should be made if possible. In this case, in one embodiment, the predicted time point of the invalidation event may be modified through adjusting the category per se.

For example, in one embodiment, category adjustment may include performing a clustering process to the training cache entries again to generate a new category. Alternatively, or additionally, in one embodiment, category adjustment may include removing the cache entries which have been invalidated before the predicted time point of the invalidation event from the category. Alternatively, or additionally, in a further embodiment, category adjustment may include removing cache entries still maintain valid after the predicted time point of the invalidation event from the category. Any other appropriate adjustment with respect to the category is possible.

By dynamically advancing and/or postponing the predicted time point for the invalidation event, change of invalidation events of one or more categories may be dynamically adapted during operation. For example, in the above example, when a predefined category is generated through clustering, it is likely that an invalidation event of a given category occurs indeed at 10:00 am. However, a service provider likely adjusts the time point for the invalidation event. For example, a hosting party of a web site may adjust the time point of updating relevant data from 10:00 am to 10:30 am. In this case, by dynamically postponing once or multiple times the predicted time point of the invalidation event during use, the predicted time point of the invalidation event may gradually tally again with the actual time point.

Further, in an embodiment of using the first percentage and the second percentage simultaneously, a correct and prompt response may also be performed to the change of category. For example, with the variation of time, time points of invalidation events of cache entries initially divided into the same category might become heterogeneous from one another. According to some embodiments of the present invention, such change may be detected and effectively dealt with by adjusting the category.

Figure 3:
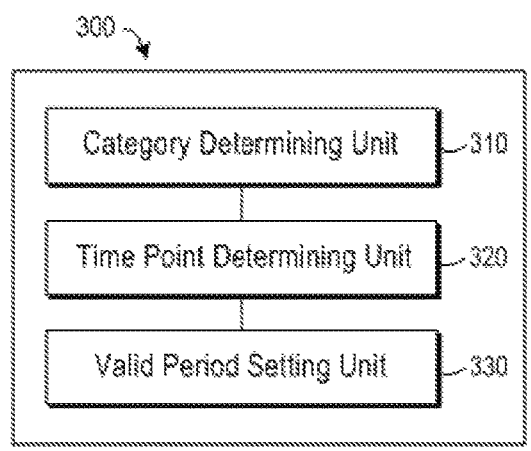
FIG. 3 shows a schematic block diagram of a cache management system according to embodiments of the present invention.

FIG. 3 shows a schematic block diagram of a system 300 for cache management according to some embodiments of the present invention. As shown in the figure, system 300 includes: a category determining unit 310 configured to determine, in response to a cache entry is created, a category for the cache entry; a time point determining unit 320 configured to determine a predicted time point of an invalidation event associated with the category, wherein occurrence of the invalidation event will cause invalidation of catching entries of the category; a valid period setting unit 330 configured to set a valid period of the cache entry based on the predicted time point.

In one embodiment, the category determining unit 310 may include: an attribute extracting unit configured to extract an attribute of the cache entry; and a category selecting unit configured to select the category of the cache entry from a plurality of predefined categories based on the attribute, the plurality of predefined categories obtained by grouping a plurality of training cache entries according to time points of invalidation events of the plurality of training cache entries.

In one embodiment, the time point determining module 320 includes: a training time point determining unit configured to determine the time points of invalidation events of training cache entries belonging to the category among the plurality of training cache entries; and a time point computing unit configured to compute the predetermined time point based on the time points of invalidation events of the training cache entries belonging to the category.

In one embodiment, system 300 may also include: a time point modifying unit configured to modify the predicted time point based on actual invalidation time points of a plurality of cache entries belonging to the category.

In one embodiment, the time point modifying unit may include: a first percentage computing unit configured to compute a first percentage of a first group of cache entries in the plurality of cache entries, the actual invalidation time points of the first group of cache entries being earlier than the predicted time point; and a time point advancing unit configured to advance the predicted time point in response to the first percentage exceeding a first threshold.

Alternatively, or additionally, in one embodiment, the time point modifying unit may include: a second percentage computing unit configured to compute a second percentage of a second group of cache entries in the plurality of cache entries, the actual invalidation time points of the second group of cache entries being later than the predicted time point; and a time point postponing unit configured to postpone the predicted time point in response to the second percentage exceeding a second threshold.

In particular, in one embodiment, the time point modifying unit may simultaneously include the first percentage computing unit and the second percentage computing unit. In such an embodiment, system 300 may further include a category adjusting unit configured to adjust the category to modify the predicted time point in response to the first percentage exceeding the first threshold and the second percentage exceeding the second threshold.

It should be noted that for the sake of clarity, FIG. 3 does not show optional units or sub-units included in system 300. All features and operations as described above are suitable for system 300, respectively, which are therefore not detailed here. Moreover, partitioning of units or subunits in system 300 is exemplary, rather than limitative, intended to describe its main functions or operations logically. A function of one unit may be implemented by a plurality of other units; on the contrary, a plurality of units may be implemented by one unit. The scope of the present invention is not limited in this aspect.

Moreover, the units included in system 300 may be implemented by various types of machine logic, including software, hardware, firmware or any combinations thereof. For example, in some embodiments, the apparatus may be implemented by software and/or firmware. Alternatively, or additionally, system 300 may be implemented partially or completely based on hardware. For example, one or more units in system 300 may be implemented as an integrated circuit (IC) chip, an application-specific integrated circuit (ASIC), a system on chip (SOC), a field programmable gate array (FPGA), etc. The scope of the present intention is not limited to this aspect.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, "removing an entry from a cache" means any way of effectively removing the cache entry from further usage, and does not necessarily mean that the data of the cache entry is physically deleted from the cache; for example, an entry may be removed simply by providing an indication that the cache entry is no longer valid.

What is claimed is:

1. A method comprising:
receiving a first cache entry and first context information associated with the first cache entry, with the context information including information indicative of a first uniform resource locator (URL) address associated with the first cache entry;
determining, by a machine learning module, that the first cache entry is in a first category of a plurality of categories based, at least in part, upon: (i) the first URL address, and (ii) a set of training cache entries that include information indicative of a plurality of cache entries used to train at least the first cache entry;
responsive to the determination that the first cache entry is in the first category, determining a predicted invalidation time point for the first cache entry;
storing the first cache entry in a cache; and
removing the first cache entry from the cache at the predicted invalidation time point for the first cache entry.

2. The method of claim 1 further comprising:
responsive to the removal of the first cache entry from the cache at the predicted invalidation point for the first cache entry, recording a first time data, with the first time data including information indicative of a valid period for removing the first cache entry based upon the predicted invalidation time point.

3. The method of claim 1 wherein each given training cache entry of the plurality of training cache entries used to train at least the first cache entry has the same invalidation time point.

4. The method of claim 1 wherein the predicted invalidation time point for the first cache entry occurs when a first data associated with the first web page occurs is exported.

5. The method of claim 1 wherein the predicted invalidation time point for the first cache entry occurs when the first data associated with the first web page is imported.

6. The method of claim 1 wherein the predicted invalidation time point for the first cache entry after a first data synchronization event associated with the first web page.

7. A computer program product comprising:
a machine readable storage device; and
computer code stored on the machine readable storage device, with the computer code including instructions and data for causing a processor(s) set to perform operations including the following:
receiving a first cache entry and first context information associated with the first cache entry, with the context information including information indicative of a first uniform resource locator (URL) address associated with the first cache entry,
determining, by a machine learning module, that the first cache entry is in a first category of a plurality of categories based, at least in part, upon: (i) the first URL address, and (ii) a set of training cache entries that include information indicative of a plurality of cache entries used to train at least the first cache entry,
responsive to the determination that the first cache entry is in the first category, determining a predicted invalidation time point for the first cache entry,
storing the first cache entry in a cache, and
removing the first cache entry from the cache at the predicted invalidation time point for the first cache entry.

8. The product of claim 7 wherein the computer code further comprises:
responsive to the removal of the first cache entry from the cache at the predicted invalidation point for the first cache entry, recording a first time data, with the first time data including information indicative of a valid period for removing the first cache entry based upon the predicted invalidation time point.

9. The product of claim 7 wherein each given training cache entry of the plurality of training cache entries used to train at least the first cache entry has the same invalidation time point.

10. The product of claim 7 wherein the predicted invalidation time point for the first cache entry occurs when a first data associated with the first web page occurs is exported.

11. The product of claim 7 wherein the predicted invalidation time point for the first cache entry occurs when the first data associated with the first web page is imported.

12. The product of claim 7 wherein the predicted invalidation time point for the first cache entry after a first data synchronization event associated with the first web page.

13. A computer system comprising:
a processor(s) set;
a machine readable storage device; and
computer code stored on the machine readable storage device, with the computer code including instructions and data for causing the processor(s) set to perform operations including the following:
receiving a first cache entry and first context information associated with the first cache entry, with the context information including information indicative of a first uniform resource locator (URL) address associated with the first cache entry,
determining, by a machine learning module, that the first cache entry is in a first category of a plurality of categories based, at least in part, upon: (i) the first URL address, and (ii) a set of training cache entries that include information indicative of a plurality of cache entries used to train at least the first cache entry, responsive to the determination that the first cache entry is in the first category, determining a predicted invalidation time point for the first cache entry, storing the first cache entry in a cache, and removing the first cache entry from the cache at the predicted invalidation time point for the first cache entry.

14. The system of claim 13 wherein the computer code further comprises:

responsive to the removal of the first cache entry from the cache at the predicted invalidation point for the first cache entry, recording a first time data, with the first time data including information indicative of a valid period for removing the first cache entry based upon the predicted invalidation time point.

15. The system of claim 13 wherein each given training cache entry of the plurality of training cache entries used to train at least the first cache entry has the same invalidation time point.

16. The system of claim 13 wherein the predicted invalidation time point for the first cache entry occurs when a first data associated with the first web page occurs is exported.

17. The system of claim 13 wherein the predicted invalidation time point for the first cache entry occurs when the first data associated with the first web page is imported.

18. The system of claim 13 wherein the predicted invalidation time point for the first cache entry after a first data synchronization event associated with the first web page.

* * * * *